(12) United States Patent
Suh et al.

(10) Patent No.: US 12,301,343 B2
(45) Date of Patent: May 13, 2025

(54) LINK ADAPTATION FOR EXTREMELY HIGH THROUGHPUT SYSTEMS

(71) Applicants: Jung Hoon Suh, Kanata (CA); Osama Aboul-Magd, Kanata (CA); Yan Xin, Kanata (CA); Kwok Shum Au, Ottawa (CA)

(72) Inventors: Jung Hoon Suh, Kanata (CA); Osama Aboul-Magd, Kanata (CA); Yan Xin, Kanata (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 17/475,541

(22) Filed: Sep. 15, 2021

(65) Prior Publication Data
US 2023/0085190 A1 Mar. 16, 2023

(51) Int. Cl.
*H04L 1/00* (2006.01)
*H04B 7/0413* (2017.01)
*H04W 80/02* (2009.01)

(52) U.S. Cl.
CPC ......... *H04L 1/0003* (2013.01); *H04B 7/0413* (2013.01); *H04L 1/0061* (2013.01); *H04W 80/02* (2013.01)

(58) Field of Classification Search
CPC ... H04L 1/0003; H04L 1/0061; H04L 1/0031; H04L 1/0025; H04L 1/0009; H04B 7/0413; H04B 7/0452; H04W 80/02
See application file for complete search history.

(56) References Cited

U.S. PATENT DOCUMENTS

2021/0045117 A1   2/2021  Chen et al.
2021/0337537 A1* 10/2021  Chun ............... H04W 4/70
(Continued)

FOREIGN PATENT DOCUMENTS

CN    107667560 A    2/2018
EP      2707981 B1   3/2014

OTHER PUBLICATIONS

IEEE 802.11ax-2021—IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications; Amendment 1: Enhancements for High-Efficiency WLAN, IEEE Std 802.11ax™-2021, 767 pages.
(Continued)

*Primary Examiner* — Gary Mui
*Assistant Examiner* — Yewon Kim (57) ABSTRACT

The application relates to link adaptation for extremely high throughput (EHT) systems. In order to transmit parameters for EHT link adaptation, a control ID field in the HT control field of a MAC header is used to indicate that the A-control field of the HT control field contains EHT link adaptation information, and to indicate the presence of an additional EHT link adaptation extension field containing further EHT link adaptation information. Alternatively, B25 of the control information of the A-control field is used to indicate that the control field contains EHT link adaptation information, and to indicate the presence of an additional EHT link adaptation extension field containing further EHT link adaptation information.

19 Claims, 9 Drawing Sheets

(56) References Cited

U.S. PATENT DOCUMENTS

| | | | |
|---|---|---|---|
| 2022/0216937 A1* | 7/2022 | Veerashetty | H04L 1/0009 |
| 2022/0255785 A1* | 8/2022 | Lim | H04L 27/2666 |
| 2023/0379760 A1* | 11/2023 | Huang | H04W 74/06 |
| 2023/0388055 A1* | 11/2023 | Chun | H04L 5/0044 |
| 2023/0412300 A1* | 12/2023 | Yu | H04L 1/0075 |

OTHER PUBLICATIONS

Wook Bong Lee et al., Considerations on Capabilities and Operation Mode: MU-MIMO, IEEE 802.11-21/0102r5, Jan. 18, 2021, 21 pages.

* cited by examiner

| Control ID value | Meaning | Length of the Control Information subfield (bits) | Content of the Control Information subfield |
|---|---|---|---|
| 0 | Triggered response scheduling (TRS) | 26 | TRS Control |
| 1 | Operating mode (OM) | 12 | OM Control |
| 2 | HE link adaptation (HLA) | 26 | HLA Control |
| 3 | Buffer status report (BSR) | 26 | BSR Control |
| 4 | UL power headroom (UPH) | 8 | UPH Control |
| 5 | Bandwidth query report (BQR) | 10 | BQR Control |
| 6 | Command and status (CAS) | 8 | CAS Control |
| 7 | EHT operating mode (EHT OM) | 6 | EHT OM Control |
| 8 | Single response scheduling (SRS) | 10 | SRS Control |
| 10 | AP assistance request (AAR) | 20 | AAR Control |
| 9,11–14 ~~7–14~~ | Reserved | | |
| 15 | Ones need expansion surely (ONES) | 26 | Set to all 1s |

Control Information in the A-Control field

| Bits: | B0 | B1 | B2 — B5 | B6 — B9 | B10 — B12 |
|---|---|---|---|---|---|
| | Unsolicited MFB | MRQ | Nss for SU-MIMO | EHT-MCS for SU-MIMO | BW |
| | 1 | 1 | 4 | 4 | 3 |

| Bits: | B13 — B21 | B22 — B23 | B24 | B25 |
|---|---|---|---|---|
| | RU Allocation | MSI/Partial PPDU Parameters | UL HE TB PPDU MFB | EHT LA Extension (Reserved) |
| | 9 | 2 | 1 | 1 |

700

EHT LA Extension field

| Bits: | B0 | B1 — B3 | B4 — B7 | B8 — B15 |
|---|---|---|---|---|
| | TX Beamforming for SU-MIMO | Nss for MU-MIMO | EHT-MCS for MU-MIMO | Reserved |
| | 1 | 3 | 4 | 8 |

| Extended Control ID | Extension Indication | LA Control Information (LA Parameters included here) |
|---|---|---|
| B0      B3 | B4 | B5      B25 |
| 4 | 1 | 21 |

Bits:

LINK ADAPTATION FOR EXTREMELY HIGH THROUGHPUT SYSTEMS

TECHNICAL FIELD

The application relates to link adaptation for extremely high throughput (EHT) systems.

BACKGROUND

Link adaptation, comprising adaptive coding and modulation (ACM) and others (such as Power Control), is a term used in wireless communications to denote the matching of the modulation, coding and other signal and protocol parameters to the conditions on the radio link (e.g. the pathloss, the interference due to signals coming from other transmitters, the sensitivity of the receiver, the available transmitter power margin, etc.).

Link adaptation in wireless local area networks (WLANs) involves the transmission of link adaptation parameters from the transmitter to the receiver. Existing methods of transmitting link adaptation parameters, for example for high throughput (HT), very high throughput (VHT), and high efficiency (HE) variants are not sufficient for use in new EHT systems.

SUMMARY

The application relates to link adaptation for extremely high throughput (EHT) systems. In order to transmit parameters for EHT link adaptation, a control ID field in the HT control field of a MAC header is used to indicate that the A-control field of the HT control field contains EHT link adaptation information, and to indicate the presence of an additional EHT link adaptation extension field containing further EHT link adaptation information. Alternatively, B25 of the control information of the A-control field is used to indicate that the control field contains EHT link adaptation information, and to indicate the presence of an additional EHT link adaptation extension field containing further EHT link adaptation information.

According to one aspect of the present disclosure, there is provided a method comprising: communicating, by a wireless communication device, a medium access control (MAC) frame comprising a MAC header, frame body and frame check sequence; the MAC header comprising: a high throughput (HT) control sub-field, the HT control sub-field indicating presence or absence of an extremely high throughput link adaptation (EHT LA) extension field, the HT control sub-field containing a control ID value and control information; when indicated to be present by the HT control sub-field, an extremely high throughput link adaptation (EHT LA) extension field, the control information in the HT control sub-field together with the EHT LA extension field containing link adaptation (LA) parameters for EHT communication.

Advantageously, this allows for extra EHT LA information to be transmitted when needed for EHT communication, and correspondingly, it does not need to be transmitted for other variants such as HT, VHT and HE.

In some embodiments, the HT control sub-field comprises a 4-bit control ID and 26 bits of control information B0, . . . , B25, and wherein B25 indicates presence or absence of an EHT LA extension field.

Advantageously, with this approach, it is not necessary to use up an un-used control ID, leaving that open for other purposes.

In some embodiments, the HT control sub-field comprises a 4-bit control ID and 26 bits of control information B0, . . . , B25, and wherein the 4-bit control ID indicates presence or absence of an EHT LA extension field.

In some embodiments, a first value of the 4-bit control ID is associated with a first format for link adaptation parameters solely within the 26 bits of control information; a second value of the 4-bit control ID is associated with a second format for link adaptation parameters within the 26 bits of control information and the EHT LA extension field.

In some embodiments, when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

In some embodiments, communicating comprises transmitting by an access point (AP).

In some embodiments, communicating comprises receiving by an access point.

In some embodiments, communicating comprises transmitting by a non-access point (AP) station (STA).

In some embodiments, communicating comprises receiving by a non-AP station (STA).

According to another aspect of the present disclosure, there is provided an access point comprising a processor and memory, the access point configured to execute a method that involves communicating, by the access point, a medium access control (MAC) frame having a MAC header, frame body and frame check sequence. The MAC header has a high throughput (HT) control sub-field, the HT control sub-field indicating presence or absence of an extremely high throughput link adaptation (EHT LA) extension field, the HT control sub-field containing a control ID value and control information. When indicated to be present by the HT control sub-field, the MAC head also has an extremely high throughput link adaptation (EHT LA) extension field. The control information in the HT control sub-field together with the EHT LA extension field contain link adaptation (LA) parameters for EHT communication.

In some embodiments, the HT control sub-field comprises a 4-bit control ID and 26 bits of control information B0, . . . , B25, and wherein B25 indicates presence or absence of an EHT LA extension field.

In some embodiments, the HT control sub-field comprises a 4-bit control ID and 26 bits of control information B0, . . . , B25, and wherein the 4-bit control ID indicates presence or absence of an EHT LA extension field.

In some embodiments, a first value of the 4-bit control ID is associated with a first format for link adaptation parameters solely within the 26 bits of control information. A second value of the 4-bit control ID is associated with a second format for link adaptation parameters within the 26 bits of control information and the EHT LA extension field.

In some embodiments, when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

According to another aspect of the present invention, there is provided a non-AP station comprising a processor and memory. The non-AP station is configured to execute a method that involves communicating, by the non-AP station, a medium access control (MAC) frame having a MAC header, frame body and frame check sequence. The MAC header has a high throughput (HT) control sub-field, the HT control sub-field indicating presence or absence of an extremely high throughput link adaptation (EHT LA) extension field, the HT control sub-field containing a control ID value and control information. When indicated to be present by the HT control sub-field, the MAC head also has an extremely high throughput link adaptation (EHT LA) extension field. The control information in the HT control sub-field together with the EHT LA extension field contain link adaptation (LA) parameters for EHT communication.

In some embodiments, the HT control sub-field comprises a 4-bit control ID and 26 bits of control information B0, . . . , B25, and wherein B25 indicates presence or absence of an EHT LA extension field.

In some embodiments, the HT control sub-field comprises a 4-bit control ID and 26 bits of control information B0, . . . , B25, and wherein the 4-bit control ID indicates presence or absence of an EHT LA extension field.

In some embodiments, a first value of the 4-bit control ID is associated with a first format for link adaptation parameters solely within the 26 bits of control information. A second value of the 4-bit control ID is associated with a second format for link adaptation parameters within the 26 bits of control information and the EHT LA extension field.

In some embodiments, when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

BRIEF DESCRIPTION OF THE DRAWINGS

Reference will now be made, by way of example, to the accompanying drawings which show example embodiments of the present application, and in which.

DETAILED DESCRIPTION

To assist in understanding the present disclosure, an example system supporting wireless communications over air interfaces is first described.

Figure 1A:
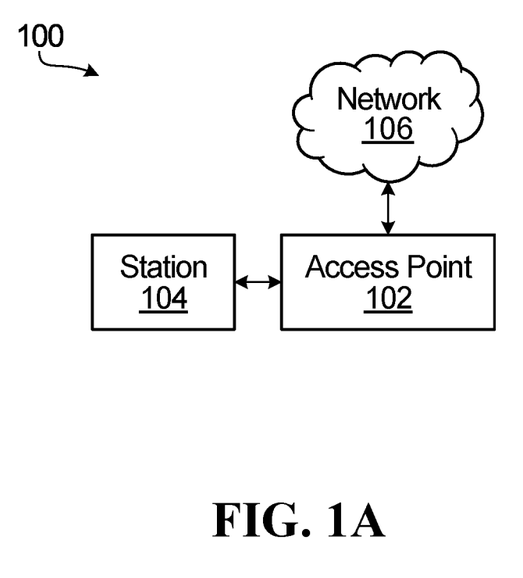
FIG. 1A is a schematic diagram illustrating an example system for EDMG communications between a STA and the network.

FIG. 1A is a schematic diagram of an example system 100 in which methods described herein may be implemented.

The system 100 shown in FIG. 1A may support a wireless local area network (WLAN) including an access point (AP) 102 and multiple stations (STAs) 104 within coverage of the AP 102. In the example shown, there is only one STA 104 and one AP 102, however there may be multiple STAs 104 and/or multiple APs 102. Each STA 104 may be any suitable device capable of wireless communication, including mobile or stationary devices such as smartphones, laptops, mobile phones or tablet devices, for example, and the STAs 104 need not be the same as each other. The STAs 104 may also be referred to as terminals, user devices, user equipment (UE) or clients, for example. The AP 102 may be also referred to as a personal basic service set (PBSS) coordinate point (PCP) or a base station. The AP 102 may be implemented as a router, for example. The STA 104 may access a network 106 via the AP 102.

The system 100 may support communication between the AP 102 and each STA 104, as well as communication directly between STAs 104 (also referred to as device-to-device communication). Using multiple antennas, the AP 102 may carry out multi-user transmissions (e.g., transmissions from the AP 102 to multiple STAs 104 simultaneously) by using the spatial reuse technique of multi-user multiple-input multiple-output (MU-MIMO). For simplicity, examples described herein may refer to wireless communications over air interfaces between a STA 104 and an AP 102, however it should be understood that the present disclosure may be equally applicable to wireless communications over air interfaces between two STAs 104, multi-user communications (e.g., between an AP 102 and multiple STAs 104), or any other wireless communications over air interfaces.

Figure 1B:
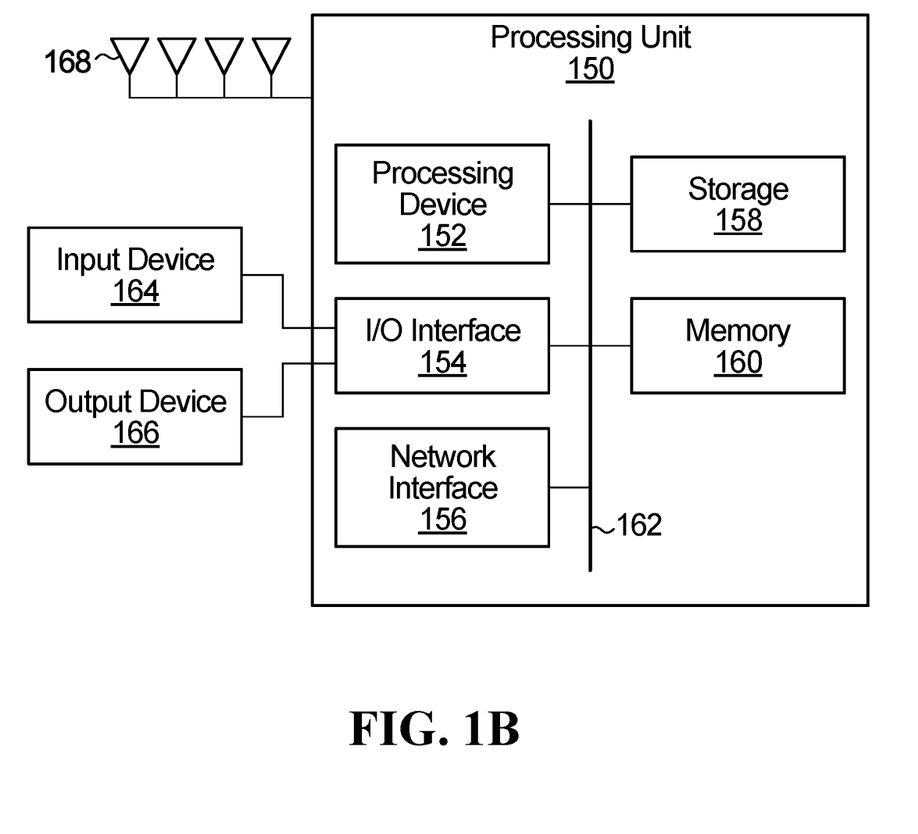
FIG. 1B is a block diagram illustrating an example device suitable for WLAN communications.

FIG. 1B is a block diagram illustrating an example processing unit 150, which may be used to implement the methods and systems disclosed herein, for example the AP 102 and/or one or more of the STAs 104. Other processing units suitable for implementing the present disclosure may be used, which may include components different from those discussed below. Although FIG. 1B shows a single instance of each component, there may be multiple instances of each component in the processing unit 150.

The processing unit 150 includes one or more processing devices 152, such as a processor, a microprocessor, an application-specific integrated circuit (ASIC), a field-programmable gate array (FPGA), a dedicated logic circuitry, or combinations thereof. The processing unit 150 may also include one or more input/output (I/O) interfaces 154, which may enable interfacing with one or more appropriate input devices 164 and/or output devices 166. The processing unit 150 includes one or more network interfaces 156 for wired or wireless communication with the network 106 (e.g., an intranet, the Internet, a P2P network, a WAN, a LAN, and/or a Radio Access Network (RAN)). The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing unit 150 may also include one or more storage units 158, which may include a mass storage unit such as a solid state drive, a hard disk drive, a magnetic disk drive and/or an optical disk drive.

The processing unit 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. For example, instructions for implementing a logical layer for supporting MLA (as described further below) may be stored in the memory(ies) 160.

The memory(ies) 160 may include other software instructions, such as for implementing an operating system and other applications/functions. In some examples, one or more data sets and/or module(s) may be provided by an external memory (e.g., an external drive in wired or wireless communication with the processing unit 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing unit 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing unit 150. In other examples, one or more of the input device(s) 164 and/or the output device(s) 166 may be included as a component of the processing unit 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing unit 150), in order to carry out wireless communication over air interfaces.

Figure 2:
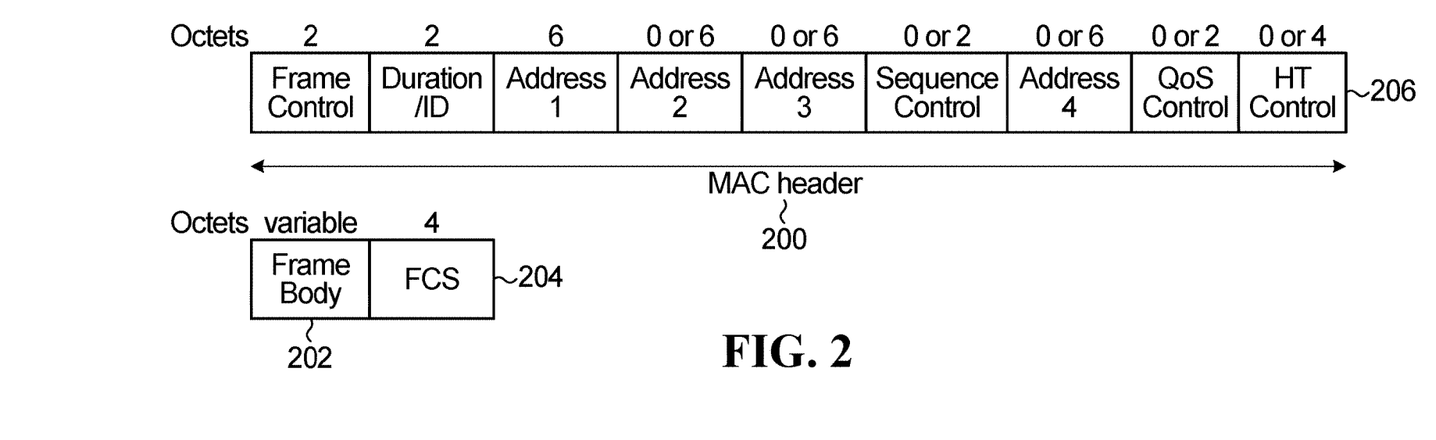
FIG. 2 depicts the format of a medium access control (MAC) frame format for high efficiency (HE) link adaptation (HLA)

FIG. 2 depicts the format of a medium access control (MAC) frame format for high efficiency (HE) link adaptation (HLA). The frame format includes a MAC header 200, frame body 202 and frame check sequence 204. Among other fields, the MAC header 100 includes a high throughput (HT) control field 106.

Figure 3A:
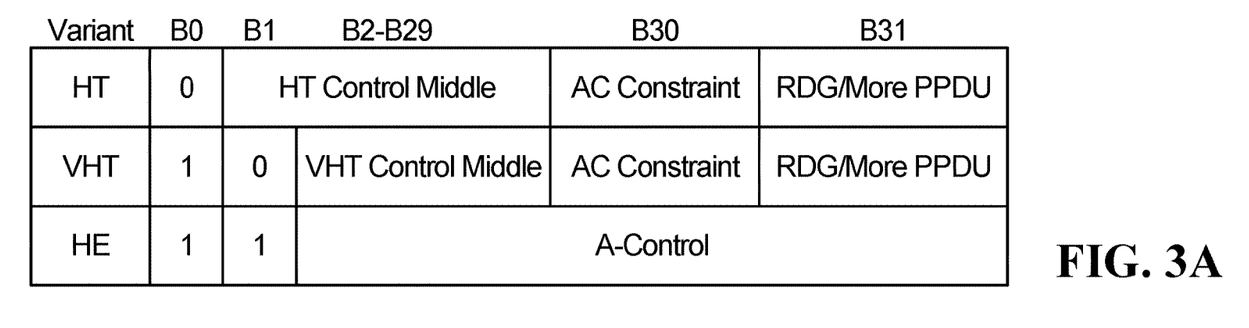
FIG. 3A depicts the format of the HT control field for high throughput (HT), very high throughput (VHT), and high efficiency (HE) variants.

The HT control field 206 is present in a Control Wrapper frame, QoS Data frame, and QoS Null frames, and is also present in management frames as determined by the +HTC subfield of the frame control field. The format of the HT control field is defined as shown in FIG. 3A for high throughput (HT), very high throughput (VHT), and high efficiency (HE) variants. For the HT variant, the fields include HT Control Middle, AC (access control) Constraint, RDG (Reverse Direction Grant)/More PPDU (PHY Protocol Data Unit). For the VHT variant, the fields include VHT Control Middle, AC Constraint, RDG/More PPDU. For the HE variant, the fields include A-Control.

The HT Control field for the VHT and HE variants carry link adaptation (LA) parameters. For the HE variant, these are carried in the A-Control subfield, as detailed below.

Figure 3B:
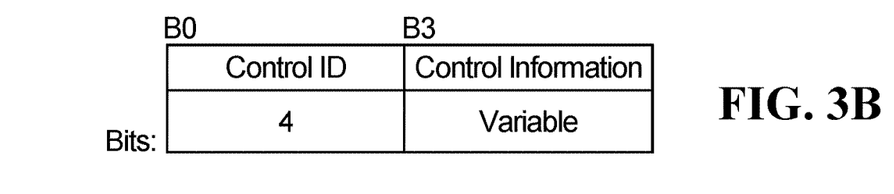
FIG. 3B depicts the format of the A-control subfield.

The A-Control subfield is 30 bits long. The format of the A-Control subfield is shown in FIG. 3B, and includes a 4-bit control ID, and 26-bit control information.

Figure 4:
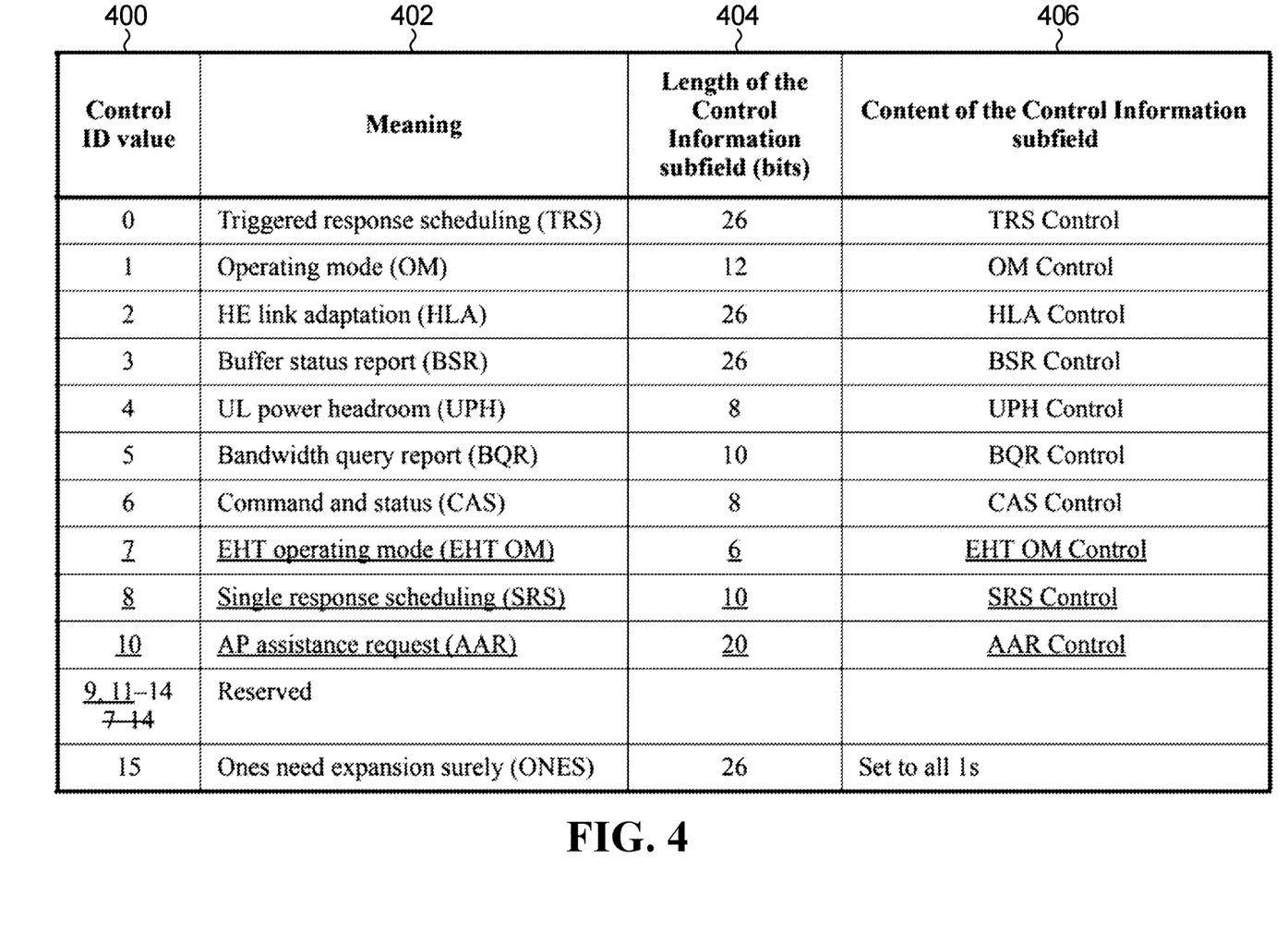
FIG. 4 is a table showing the meaning of the control ID subfield value.

FIG. 4 is a table showing the meaning of the control ID subfield value defined in 802.11be D1.0. The control ID value is indicated in column 200, corresponding meaning in column 202, length of control information subfield in column 204, and content of the subfield in column 206. Different control ID values are assigned to indicate 11 different control frames.

The remaining 26 bits beyond the 4-bit control ID are used for the control information in the A-Control subfield. As can be seen from the length of control information indicated in column 204, some control IDs do not fully utilize all 26 bits of the control information subfield, and in this case, the remainder of the control information subfield is padded with zeros. The control ID value of "2" with 4-bit binary representation "0010" indicates a control frame contains an HLA control subfield. In this type of control frame, the full 26 bits are allocated for control information without zero padding.

Figure 5:
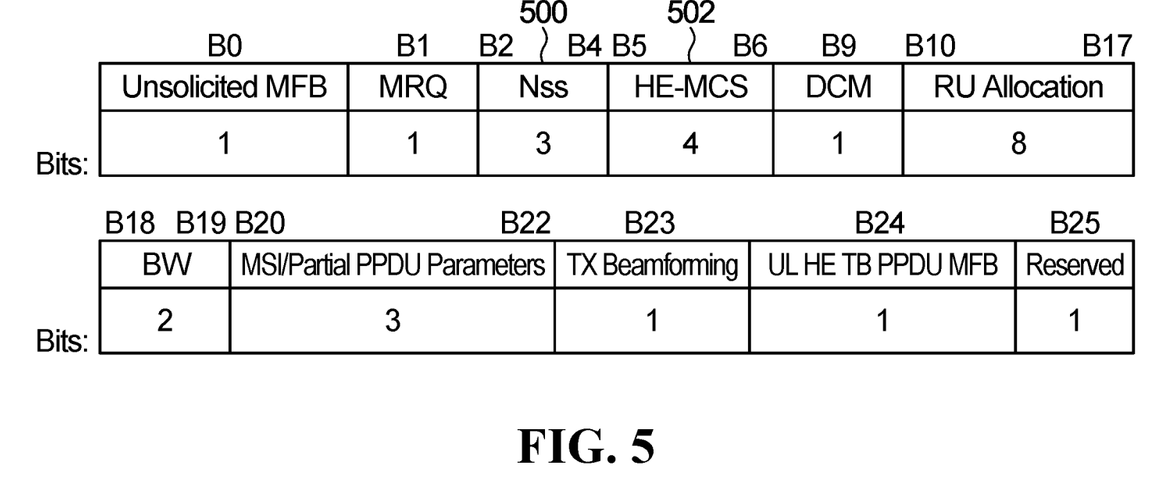
FIG. 5 depicts a format for the HLA control subfield.

FIG. 5 depicts the HLA control subfield format specified in 802.11ax, which shows how 26 bits are utilized for the indication of HE link adaptation (HLA) parameters. Among other parameters, the HLA parameters include one parameter to indicate a number of spatial streams, namely parameter Nss 300 and one parameter to indicate modulation and coding scheme (MCS), namely parameter HE-MCS 302.

The 26-bit A-Control subfield of the HT Control field is not large enough to carry additional LA parameters for EHT such as separate Nss parameters for single user-multiple input multiple output (SU-MIMO) and multi-user MIMO (MU-MIMO), and separate MCS parameters for SU-MIMO and MU-MIMO.

In a first embodiment, one of the remaining control ID values (e.g. 9) in the A-Control subfield is used to indicate that the remaining 26 bits of the A-control sub-field contain EHT LA control information, and to indicate the presence of an additional EHT LA extension Field.

In another embodiment, a new control ID is not used to indicate EHT LA control information; rather, the control ID "2" already used for HE link adaptation is also used for EHT LA control information. Reserved bit (B25) of control information in the A-Control subfield is used to indicate that the control information is EHT LA control information as opposed to HE control information, and to indicate the presence or absence of the additional EHT LA extension field. For example, setting the reserved bit to "0" may be used to indicate the A-control subfield contains control information for HE link adaptation, and setting the reserved bit to "1" may be used to indicate the A-control subfield and the additional EHT LA extension field contain control information for EHT link adaptation. The EHT LA Extension field is an additional field which, together with the 26 bits of the A-control sub-field, provides sufficient capacity for EHT link adaptation parameters.

Figure 6:
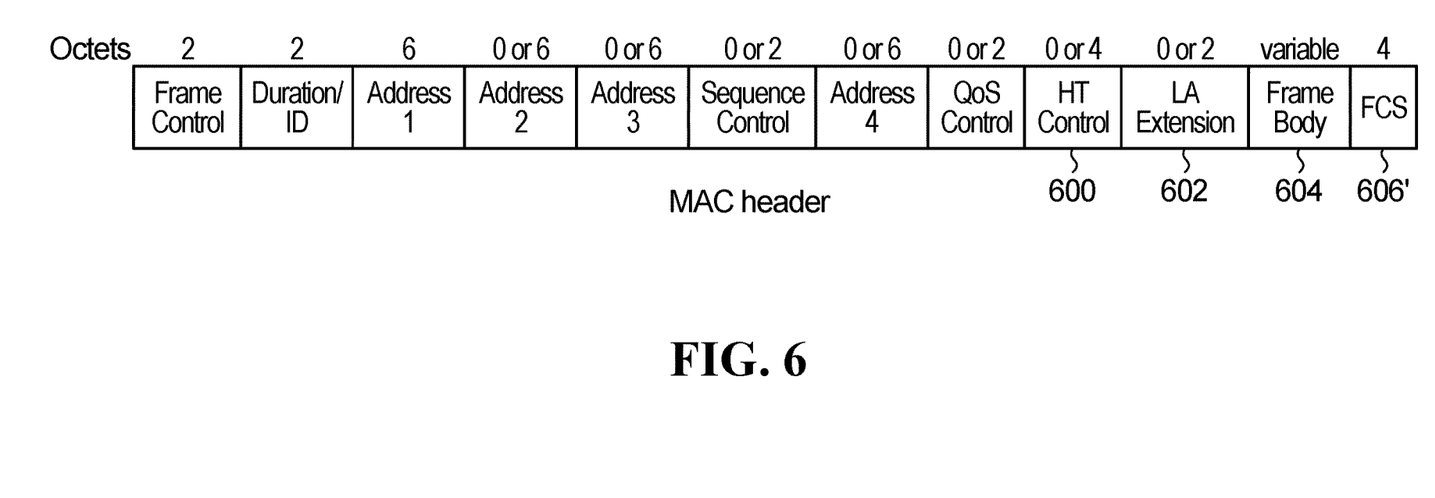
FIG. 6 depicts a MAC frame format including an EHT LA extension field.

The EHT LA extension field is an additional field in the MAC header of a management or a data frame. In some embodiments, the EHT LA extension field is located immediately after the HT control field in the MAC header as shown in FIG. 6, where HT control is indicated at 400, the EHT LA extension field is indicated at 402 before the frame body 404 and FCS 406. That is, the location of EHT LA Extension Field comes after the HT Control Field and before the Frame Body.

In a specific example implementation, the size of the EHT LA extension field is 2 bytes; however, a different size may be used depending on the EHT LA parameters to be included. For example, the length can be 3 or 4 bytes depending on EHT LA parameters. In some embodiments, the length of the EHT extension field is fixed.

In another embodiment, a variable length for the EHT LA extension field is provided. In this case, a subfield in the A-control field or the EHT LA extension field is used to indicate the length of the EHT LA extension field.

Figure 7:
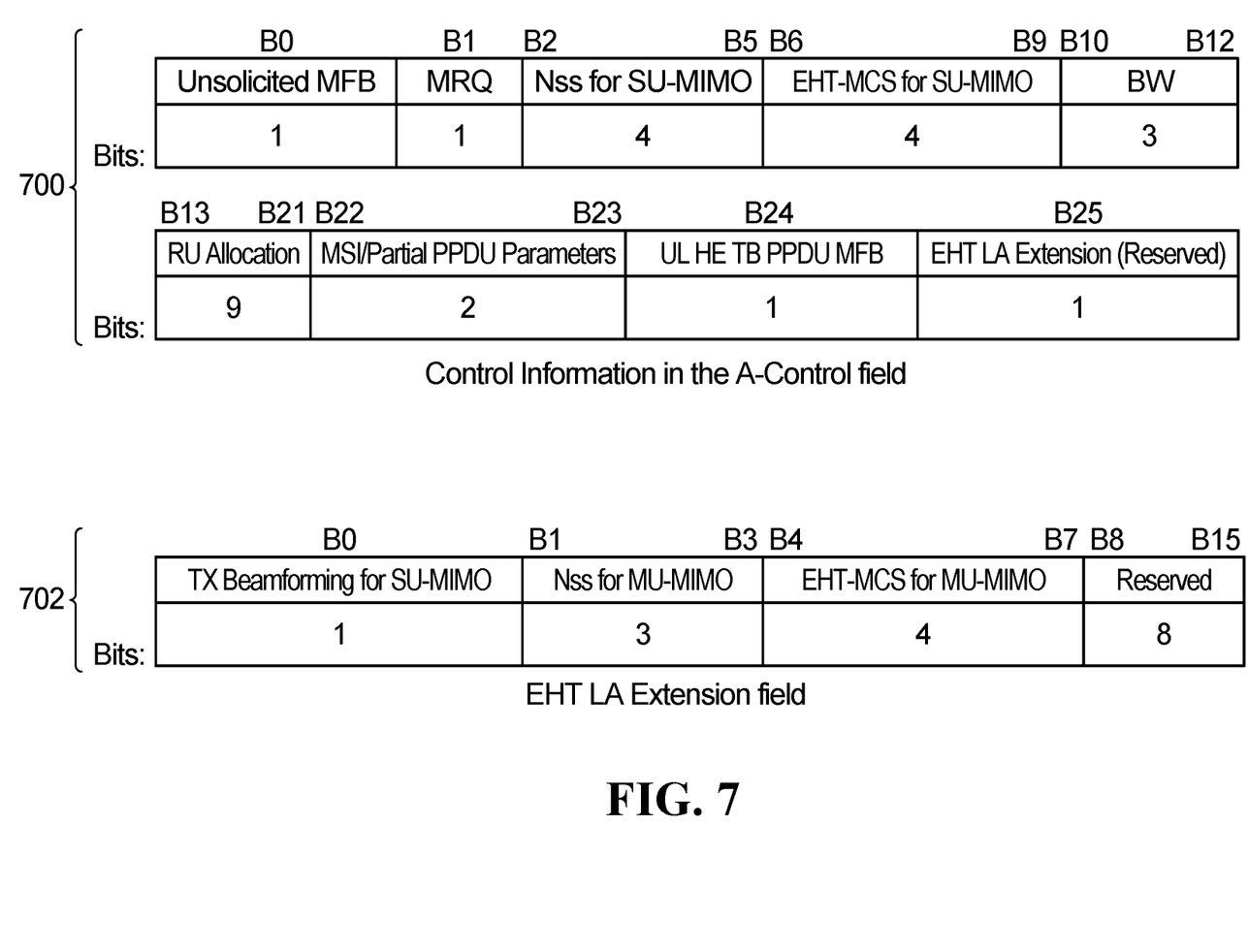
FIG. 7 depicts an example for how to allocate the EHT LA parameters in the MAC header of an EHT data or management frame.

The entire EHT LA parameters can be carried using the combination of the control information subfield of the A-Control subfield and the EHT LA extension field. FIG. 7 shows an example for how to allocate the EHT LA parameters in the MAC header of an EHT data or management frame.

Some of the parameters are in the control information subfield of the A-Control subfield as indicated by 500 and in the EHT LA extension field 502. In the example of FIG. 7, the SU-MIMO related parameters (NSS for SU-MIMO and EHT-MCS for SU-MIMO) are indicated in the A-Control subfield 500 and the MU-MIMO related parameters (NSS for MU-MIMO and EHT-MCS for MU-MIMO) are indicated in the EHT LA extension field 502. However, the detailed parameter locations shown in FIG. 7 are simple one example. The meaning of the parameters shown in FIG. 7 is detailed below.

Unsolicited MFB: this is an unsolicited MCS feedback (MFB) indicator. This is set to 1 if it is an unsolicited MFB. This is set to 0 if it is an MRQ or a solicited MFB.

MRQ (MCS request): this is an EHT Link Adaptation (ELA) feedback request indicator. this is set to 1 with Unsolicited MFB set to 0 to request an ELA feedback. This is set to 0 with Unsolicited MFB set to 0 to respond to an ELA request. If the Unsolicited MFB is 1, the MRQ is reserved.

Nss for SU-MIMO: this is a recommended number of spatial streams for SU-MIMO. If the Unsolicited MFB is 1 and the UL EHT TB PPDU MFB is 0 or if the Unsolicited MFB is 0 and the MRQ is 0, the Nss for SU-MIMO indicates the recommended number of spatial streams to the PPDU sent to the STA, Nss for SU-MIMO case, and is set to Nss for SU-MIMO-1. If the Unsolicited MFB is 1 and the UL EHT TB PPDU MFB is 1, the NSS indicates the recommended number of spatial streams to the EHT TB PPDU sent from the STA, Nss for SU-MIMO, and is set to Nss for SU-MIMO-1. Otherwise, this subfield is reserved EHT-MCS for SU-MIMO: this is a recommended EHT-MCS for SU-MIMO. If the Unsolicited MFB is 1 and the UL EHT TB PPDU MFB is 0 or if the Unsolicited MFB is 0 and the MRQ is 0, the EHT-MCS indicates the recommended EHT-MCS of the PPDU sent to the STA, and is set to the EHT-MCS index. If the Unsolicited MFB is 1 and the UL EHT TB PPDU MFB subfield is 1, the EHT-MCS indicates the recommended EHT-MCS of the EHT TB PPDU sent from the STA, and is set to the EHT-MCS index. Otherwise, this subfield is reserved.

Nss for MU-MIMO: this is a recommended number of spatial streams for MU-MIMO. If the Unsolicited MFB is 1 and the UL EHT TB PPDU MFB is 0 or if the Unsolicited MFB is 0 and the MRQ is 0, the Nss for MU-MIMO indicates the recommended number of spatial streams to the PPDU sent to the STA, Nss for MU-MIMO case, and is set to Nss for MU-MIMO-1. If the Unsolicited MFB is 1 and the UL EHT TB PPDU MFB is 1, the NSS indicates the recommended number of spatial streams to the EHT TB PPDU sent from the STA, Nss for MU-MIMO, and is set to Nss for MU-MIMO-1. Otherwise, this subfield is reserved.

EHT-MCS for MU-MIMO: this is a recommended EHT-MCS for MU-MIMO. If the Unsolicited MFB is 1 and the UL EHT TB PPDU MFB is 0 or if the Unsolicited MFB is 0 and the MRQ is 0, the EHT-MCS indicates the recommended EHT-MCS of the PPDU sent to the STA, and is set to the EHT-MCS index. If the Unsolicited MFB is 1 and the UL EHT TB PPDU MFB subfield is 1, the EHT-MCS indicates the recommended EHT-MCS of the EHT TB PPDU sent from the STA, and is set to the EHT-MCS index. Otherwise, this subfield is reserved.

RU Allocation: this is the resource unit (RU) of the recommended EHT-MCS/RU specified by MFB requester to get feedback. If the Unsolicited MFB is 1 and the UL EHT TB PPDU MFB is 0, the RU Allocation indicates the RU for which the recommended EHT-MCS applies to the PPDU sent to the STA. If the Unsolicited MFB is 0 and the MRQ is 1, the RU indicates the RU requested by the MFB requester to get feedback. The RU Allocation is interpreted with the BW to specify the RU. If the Unsolicited MFB is 1 and the UL EHT TB PPDU MFB is 1, the RU Allocation indicates the RU for which the recommended EHT-MCS applies to the EHT TB PPDU sent from the STA and that the actual allocation of the RU can be ignored by the recipient. Otherwise, this subfield is reserved.

BW: this is bandwidth of the recommended EHT-MCS/Bandwidth specified by MFB requester to get feedback; If the Unsolicited MFB is 1 and the UL EHT TB PPDU MFB is 0, the BW indicates the bandwidth for which the recommended HE-MCS applies to the PPDU sent to the STA. If the Unsolicited MFB is 1 and the UL EHT TB PPDU MFB is 1, the BW indicates the bandwidth for which the recommended EHT-MCS applies to the EHT TB PPDU sent from the STA. If the Unsolicited MFB is 0 and the MRQ is 1, the BW indicates the bandwidth requested by the MFB requester to get feedback. Set to 0 for 20 MHz. Set to 1 for 40 MHz. Set to 2 for 80 MHz. Set to 3 for 160 MHz Set to 4 for 320-1 MHz. Set to 5 for 320-2 MHz. Otherwise, this subfield is reserved MSI/Partial PPDU Parameters: these are partial parameters of the measured PPDU/MRQ sequence identifier. If the Unsolicited MFB is 0 and the MRQ is 1, the MSI/Partial PPDU Parameters contains a sequence number in the range 0 to 3 that identifies the specific EHT-MCS feedback request. If the Unsolicited MFB is 0 and the MRQ is 0, the MSI/Partial PPDU Parameters contains a sequence number in the range 0 to 3 that responds to the specific solicited EHT-MCS feedback request. If the Unsolicited MFB is 1, the MSI/Partial PPDU Parameters contains the PPDU Format and Coding Type TX Beamforming: this indicates transmission type of the measured PPDU. If the Unsolicited MFB is 1 and the UL EHT TB PPDU MFB is 0, then the Tx Beamforming subfield indicates whether the PPDU from which the unsolicited MFB was estimated is beamformed. Set to 0 for non-beamformed PPDU. Set to 1 for beamformed PPDU. Otherwise, this subfield is reserved UL EHT TB PPDU MFB: this is the UL EHT TB PPDU MFB indication. If the Unsolicited MFB is 1, a value of 1 in this subfield indicates that the Nss, EHT-MCS, BW and RU Allocation subfields represent the recommended MFB for the EHT TB PPDU sent from the STA. Otherwise, this subfield is reserved.

Systems and methods are provided for accommodating EHT LA parameters in the MAC header of management or data frames.

Figure 8:
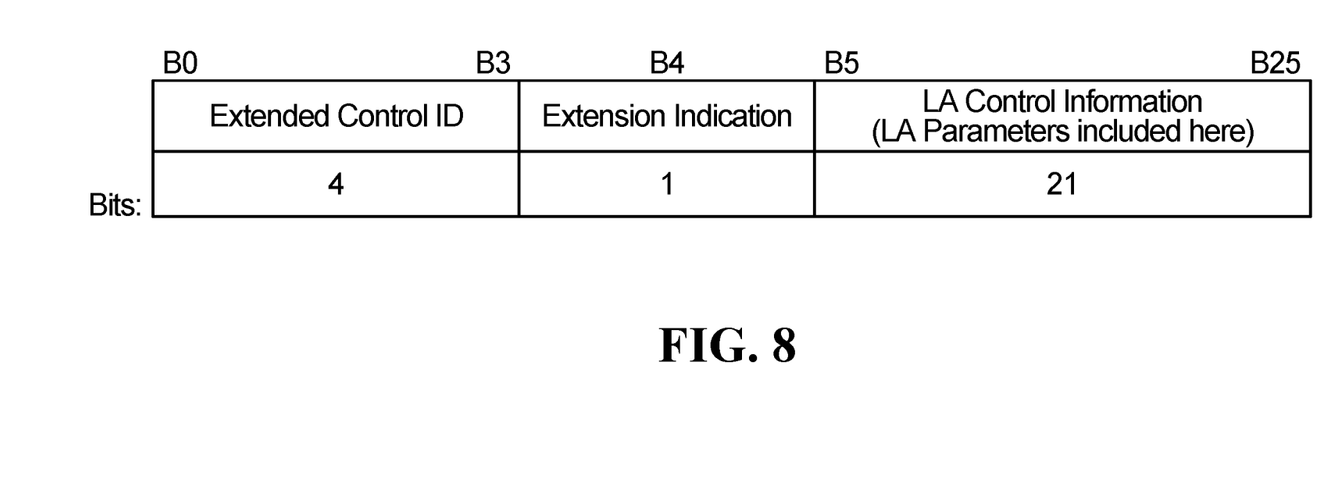
FIG. 8 depicts an example for how to allocate the EHT LA parameters using control ID 15.

Referring again to FIG. 4, in another embodiment, the Control ID 15, ONES, is used for an Extended A-Control field. That is, when the Control ID of the A-Control field is set to 15, the 26-bit control information can be set as in FIG. 8. In the 26-bit control information, the first 4 bits are used for an extended control ID so that 16 more control IDs for A-Control field are available. The remaining 22 bits for the control information. In this 22 bits, the first bit (B4 in FIG. 8) indicates the presence of an LA extension field, such as the LA extension field of FIG. 6. The remaining control information bits (B5 to B25 in FIG. 8) carry LA parameters and the rest of the LA parameters are carried in the LA Extension field as in FIG. 6. The size of extended control ID subfield and the size of extension indication subfield in FIG. 8 are specific examples, and may be assigned with different sizes such as 6 bits for the extended control ID subfield and 2 bits for the extension indication subfield, for example.

In some embodiments, a transmitter, which may be an AP or a non-AP STA for example, determines EHT LA link adaptation information for EHT transmission. Detailed examples of EHT LA parameters are described above. Determining the EHT LA parameters can involve making channel measurements. The transmitter then sends the EHT LA information using one of the methods described above. After that, data transmission takes place using the updated EHT LA parameters. This is done until the EHT LA parameters are updated again.

Figure 9:
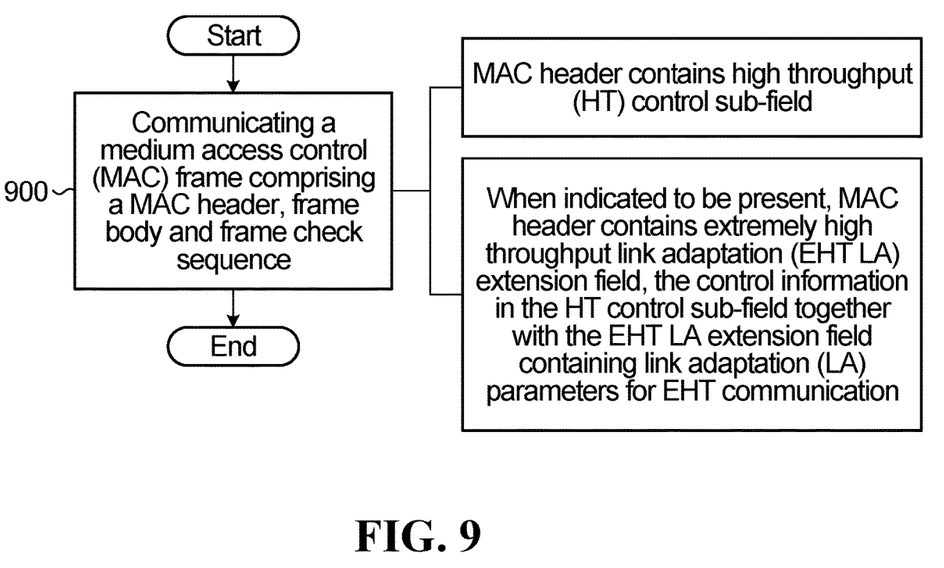
FIG. 9 is a flowchart of a method of communicating EHT LA parameters.

Referring now to FIG. 9, shown is a flowchart of a method of communicating EHT LA parameters. The method begins in block 900 with communicating, by a wireless communication device, a medium access control (MAC) frame comprising a MAC header, frame body and frame check sequence. The MAC header comprises a high throughput (HT) control sub-field, the HT control sub-field indicating presence or absence of an extremely high throughput link adaptation (EHT LA) extension field, the HT control sub-field containing a control ID value and control information. When indicated to be present by the HT control sub-field (yes path block 902), the MAC header also has an extremely high throughput link adaptation (EHT LA) extension field, the control information in the HT control sub-field together with the EHT LA extension field containing link adaptation (LA) parameters for EHT communication.

Any of the described methods of indicating the presence of the EHT LA extension field can be employed.

The communicating can involve receiving by an access point. Alternatively communicating can involve transmitting by an access point. The communicating can involve receiving by a non-AP station. Alternatively communicating can involve transmitting by a non-AP station.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
communicating, by a wireless communication device, a medium access control (MAC) frame comprising a MAC header, frame body and frame check sequence;
the MAC header comprising:
a high throughput (HT) control sub-field, the HT control sub-field indicating presence or absence of an extremely high throughput link adaptation (EHT LA) extension field, the HT control sub-field containing a control ID value and control information;
when the HT control sub-field indicates that an extremely high throughput link adaptation (EHT LA) extension field is present, the control information in the HT control sub-field together with the EHT LA extension field contains link adaptation (LA) parameters for EHT communication.

2. The method of claim 1 wherein:
the HT control sub-field comprises a 4-bit control ID and 26 bits of control information B0, . . . , B25, and wherein B25 indicates presence or absence of an EHT LA extension field.

3. The method of claim 1 wherein:
the HT control sub-field comprises a 4-bit control ID and 26 bits of control information B0, . . . , B25, and wherein the 4-bit control ID indicates presence or absence of an EHT LA extension field.

4. The method of claim 3 wherein:
a first value of the 4-bit control ID is associated with a first format for link adaptation parameters solely within the 26 bits of control information;
a second value of the 4-bit control ID is associated with a second format for link adaptation parameters within the 26 bits of control information and the EHT LA extension field.

5. The method of claim 1 wherein:
when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

6. The method of claim 1 wherein communicating comprises transmitting by an access point (AP).

7. The method of claim 1 wherein communicating comprises receiving by an access point.

8. The method of claim 1 wherein communicating comprises transmitting by a non-access point (AP) station (STA).

9. The method of claim 1 wherein communicating comprises receiving by a non-AP station (STA).

10. An access point comprising a processor and memory, the access point configured to execute a method comprising:
communicating, by the access point, a medium access control (MAC) frame comprising a MAC header, frame body and frame check sequence;
the MAC header comprising:
a high throughput (HT) control sub-field, the HT control sub-field indicating presence or absence of an extremely high throughput link adaptation (EHT LA) extension field, the HT control sub-field containing a control ID value and control information;
when the HT control sub-field indicates that an extremely high throughput link adaptation (EHT LA) extension field is present, the control information in the HT control sub-field together with the EHT LA extension field contains link adaptation (LA) parameters for EHT communication.

11. The access point of claim 10 wherein:
the HT control sub-field comprises a 4-bit control ID and 26 bits of control information B0, . . . ,B25, and wherein B25 indicates presence or absence of an EHT LA extension field.

12. The access point of claim 10 wherein:
the HT control sub-field comprises a 4-bit control ID and 26 bits of control information B0, . . . ,B25, and wherein the 4-bit control ID indicates presence or absence of an EHT LA extension field.

13. The access point of claim 12 wherein:
a first value of the 4-bit control ID is associated with a first format for link adaptation parameters solely within the 26 bits of control information;

a second value of the 4-bit control ID is associated with a second format for link adaptation parameters within the 26 bits of control information and the EHT LA extension field.

14. The access point of claim 10 wherein:

when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

15. A non-AP station comprising a processor and memory, the non-AP station configured to execute a method comprising:

communicating, by the non-AP station, a medium access control (MAC) frame comprising a MAC header, frame body and frame check sequence;

the MAC header comprising:

a high throughput (HT) control sub-field, the HT control sub-field indicating presence or absence of an extremely high throughput link adaptation (EHT LA) extension field, the HT control sub-field containing a control ID value and control information;

when the HT control sub-field indicates that an extremely high throughput link adaptation (EHT LA) extension field is present, the control information in the HT control sub-field together with the EHT LA extension field contains link adaptation (LA) parameters for EHT communication.

16. The non-AP station of claim 15 wherein:

the HT control sub-field comprises a 4-bit control ID and 26 bits of control information $B_0, \ldots, B_{25}$, and wherein B25 indicates presence or absence of an EHT LA extension field.

17. The non-AP station of claim 15 wherein:

the HT control sub-field comprises a 4-bit control ID and 26 bits of control information $B_0, \ldots, B_{25}$, and wherein the 4-bit control ID indicates presence or absence of an EHT LA extension field.

18. The non-AP station of claim 17 wherein:

a first value of the 4-bit control ID is associated with a first format for link adaptation parameters solely within the 26 bits of control information;

a second value of the 4-bit control ID is associated with a second format for link adaptation parameters within the 26 bits of control information and the EHT LA extension field.

19. The non-AP station of claim 15 wherein:

when the HT control sub-field indicates presence of an EHT LA extension field, the HT control sub-field comprises fields for NSS for SU-MIMO and MCS for SU-MIMO, and the EHT LA extension field contains fields for NSS for MU-MIMO and MCS for MU-MIMO.

* * * * *

UNITED STATES PATENT AND TRADEMARK OFFICE
CERTIFICATE OF CORRECTION

| | | |
|---|---|---|
| PATENT NO. | : 12,301,343 B2 | Page 1 of 1 |
| APPLICATION NO. | : 17/475541 | |
| DATED | : May 13, 2025 | |
| INVENTOR(S) | : Jung Hoon Suh et al. | |

It is certified that error appears in the above-identified patent and that said Letters Patent is hereby corrected as shown below:

In the Claims

Column 12, Line 3, Claim 16:
"26 bits of control information $B_0, \ldots, B25$, and wherein"
Should be:
-- 26 bits of control information $B0, \ldots, B25$, and wherein --

Column 12, Line 8, Claim 17:
"26 bits of control information $B_0, \ldots, B25$, and wherein"
Should be:
-- 26 bits of control information $B0, \ldots, B25$, and wherein --

Signed and Sealed this
Twenty-first Day of October, 2025

John A. Squires
*Director of the United States Patent and Trademark Office*